(12) United States Patent
Rollins (10) Patent No.: US 6,201,632 B1
(45) Date of Patent: Mar. 13, 2001

(54) FEED FORWARD OPTICAL FREQUENCY/PHASE DEMODULATOR

(75) Inventor: David L. Rollins, Hawthorne, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/322,288

(22) Filed: May 28, 1999

(51) Int. Cl.[7] .............................. G02F 1/03; G02F 2/00; G02F 1/23; G02F 1/01

(52) U.S. Cl. ...................... 359/259; 359/325; 359/278; 359/279

(58) Field of Search ...................... 359/189, 245, 359/259, 278, 279, 325; 250/206

(56) References Cited

U.S. PATENT DOCUMENTS

| 4,769,853 | * | 9/1988 | Goodwin et al. | 359/183 |
| 4,882,775 | * | 11/1989 | Coleman | 259/182 |
| 5,249,243 | * | 9/1993 | Skeie | 385/3 |
| 5,373,389 | * | 12/1994 | Huber | 359/195 |
| 5,402,259 | | 3/1995 | Lembo et al. | 359/245 |
| 5,781,327 | * | 7/1998 | Brock et al. | 359/259 |

OTHER PUBLICATIONS

Yabre, G., "Analog Direct–Modulation Behavior of Semiconductor Laser Transmitters Using Optical FM Demodulation," Mar. 1998, pp. 411–418, Journal of Lightwave Technology, vol. 16, No. 3.

Ackerman, E., "Linearization of a Broadband Analog Optical Link Using Multiple Wavelengths," pp. 45–48, 1998 IEEE, Int'l. Topical Meeting on Microwave Photonics, Oct. 12–14, 1998.

* cited by examiner

Primary Examiner—Georgia Epps
Assistant Examiner—David N. Spector
(74) Attorney, Agent, or Firm—Michael S. Yatsko (57) ABSTRACT

A demodulation system used in connection with an analog optical link that provides a wide dynamic range and SNR potential for large RF signal bandwidths. An optical carrier signal modulated with an RF signal is applied to an optical splitter in the demodulation system that splits the signal into first and second carrier signals. One of the carrier signals is applied to a coarse demodulator that provides either PM or FM demodulation to generate a demodulated signal representative of the signal that includes the RF signal and the additive inverse of an error signal. The output from the coarse demodulator is inverted, and integrated in the FM case, and then applied to a phase modulator along with the second optical carrier signal from the optical splitter. The phase modulator modulates the optical carrier signal with the additive inverse of the demodulated signal so that the portion of the RF signal occurring in both the optical carrier signal and the demodulated signal are cancelled, and the optical carrier signal is modulated with the error signal. The modulated carrier signal is applied to a fine demodulator that demodulates the signal to generate the error signal. The error signal and the demodulated signal are combined, and what remains is a substantial copy of the RF signal with minimal excess noise and distortion. Unbalanced Mach-Zehnder interferometers and photodetectors can be provided in the coarse demodulator and the fine demodulator to provide the demodulation.

24 Claims, 4 Drawing Sheets

FEED FORWARD OPTICAL FREQUENCY/PHASE DEMODULATOR

STATEMENT REGARDING FEDERALLY SPONSORED RESEARCH OR DEVELOPMENT

This U.S. Government has certain rights in this invention pursuant to the clause at FAR 52.227-12.

BACKGROUND OF THE INVENTION

1. Field of the Invention

This invention relates generally to an optical demodulation system employed in an analog optical link and, more particularly, to a feed-forward optical frequency demodulation or phase demodulation system including both coarse and fine demodulators and employed at an end of an analog optical link.

2. Discussion of the Related Art

Analog optical links are used in various optical communications systems where the transmission of large bandwidth signals are required, without the need for analog-to-digital (A/D) converters or digital-to-analog (D/A) converters. These analog optical links transmit RF signals modulated onto an optical carrier signal. The optical carrier signal generally is transmitted along a fiber optic cable or through free space to a receiver where it is demodulated to recover the RF data. The optical link allows the RF data to be transmitted with low losses and at high bandwidths, and thus is attractive in many communications systems to provide the desired performance, especially high frequency RF communications systems that transmit signals in the GHz bandwidth range. Also, telescopes used to transmit optical signals in free space have a much greater directivity than RF antennas of comparable size.

To have the desired performance for various communications systems, the optical link must provide a good dynamic range, i.e., allow the simultaneous transmission of signals having widely varying amplitudes that do not interfere with each other, and with minimal optical power requirements. Currently, intensity modulation (IM) is the dominant optical modulation choice for analog optical links. In IM, the intensity of the optical light is modulated with the RF signal. Unfortunately, IM does not provide high enough performance because significant transmission power is required to provide the desirable dynamic range and signal-to-noise ratio (SNR) for a particular application. In fact, ideal linear IM requires 9 dB more received optical power than ideal suppressed carrier amplitude modulation (AM) to get the same demodulated SNR. To overcome this problem, known intensity modulation optical links provide a series of optical amplifiers to boost the optical carrier signal power as it propagates along an optical fiber. The number of optical amplifiers needed can be costly. Also this technique cannot be used for free space links.

Wideband frequency modulated (FM) or phase modulated (PM) optical links can theoretically use the extremely wide bandwidth available at optical frequencies to achieve much better dynamic range and SNR than IM optical links for the same received power. For example, phase modulation having a peak phase deviation of 10 radians has a 26 dB greater link SNR potential compared to ideal IM, and a 17 dB greater SNR potential than suppressed-carrier AM.

Known FM or PM communications systems must significantly modulate the carrier frequency or phase to achieve better dynamic range and SNR performance than AM. In other words, the frequency deviation or phase deviation of the carrier signal which is induced by RF input signal must be large enough to increase the bandwidth of the modulated carrier substantially beyond that of an AM modulated carrier.

For FM or PM links using RF carrier signals, two basic demodulators are used. Both provide high dynamic range and SNR performance. The most basic demodulator uses an RF frequency discriminator followed by an RF envelope detector. The more complex demodulator uses a phase lock loop, but has the advantage of a lower threshold SNR. The threshold SNR is the received SNR in the transmission bandwidth above which the demodulator performs well.

The basic RF demodulator concept cannot be used when the carrier signal is optical, because a true optical envelope detector does not exist. The closest equivalent optical demodulator is an optical filter with a linear frequency-to-intensity transfer function followed by a photodetector which converts the intensity into an electrical current. One of the best implementation uses a dual-output unbalanced Mach-Zehnder interferometer (MZI) followed by a balanced photoreceiver. This demodulator works well when the frequency or phase deviation is small. However, when the frequency or phase deviation is large, it generates excess noise, causing the noise floor to rise significantly. A fast optical limiter is needed to prevent this noise floor rise. This demodulator also has significant third-order spurs and distortion which limit its dynamic range. The practical performance of this type of analog optical link is therefore not substantially better than known IM links.

Hybrid RF/optical demodulators with feedback, patterned after the RF phase lock loop, may provide high dynamic range and SNR performance for moderate RF signal bandwidths. But the time delays in the feedback path limit their performance for RF signals with bandwidths greater than a few GHz.

What is needed is a demodulation system to be used in connection with an analog optical link that provides suitable wideband FM or PM dynamic range and SNR potential, and handles large RF signal bandwidths. It is therefore an object of the present invention to provide such a demodulation system.

SUMMARY OF THE INVENTION

In accordance with the teachings of the present invention, a demodulation system for use in connection with an analog optical link is disclosed that provides a wide dynamic range and SNR potential for large RF signal bandwidths. An optical carrier signal modulated with an RF signal is applied to an optical splitter in the demodulation system that splits the signal into first and second carrier signals. One of the carrier signals is applied to a coarse demodulator that provides either PM or FM demodulation to generate a coarse demodulated signal that includes the RF signal and the additive inverse of an error signal. The error signal includes the theoretical minimum noise floor, as well as excess noise and distortion introduced by the coarse demodulator when the frequency or phase deviation is large. The output from the coarse demodulator is inverted, and integrated in the FM case, and then applied to a phase modulator along with the second optical carrier signal from the optical splitter. The phase modulator modulates the optical carrier signal with the additive inverse of the demodulated signal from the coarse demodulator so that the portion of the RF signal occurring in both the optical carrier signal and the demodulated signal is cancelled, and the optical carrier signal is modulated with the error signal. This modulated carrier signal, which now has a small frequency or phase deviation, is applied to a fine demodulator that demodulates the signal to generate the error signal. The error signal and the demodulated signal from the coarse demodulator are then combined so that the error signals cancel, and what remains is a substantial copy of the RF signal with minimal excess noise and distortion.

In a particular embodiment, both the coarse demodulator and the fine demodulator include unbalanced Mach-Zehnder interferometers that provide complementary signals of the split carrier signal. The complementary signals are applied to photodetectors that demodulate the signals and convert them to electrical signals. The electrical signals are applied to a differential amplifier that generates an output signal proportional to the difference between the complementary signals, and removes the bias added by the Mach-Zehnder interferometer as well as all common mode noise and distortion. If the coarse and fine demodulators are PM demodulators, the output of the differential amplifier is applied to an RF integrator to provide PM demodulation.

The phase modulator that receives the split signal and the inverted demodulated signal from the coarse demodulator can be positioned before the fine demodulator or in one of the paths of the Mach-Zehnder interferometer within the fine demodulator in different embodiments.

Additional objects, features and advantages of the present invention will become apparent from the following description and appended claims taken in conjunction with the accompanying drawings.

DETAILED DESCRIPTION OF THE PREFERRED EMBODIMENTS

The following discussion of the preferred embodiments directed to an FM demodulator and a PM demodulator for an analog optical link is merely exemplary in nature, and is in no way intended to limit the invention or its applications or uses.

Figure 1:
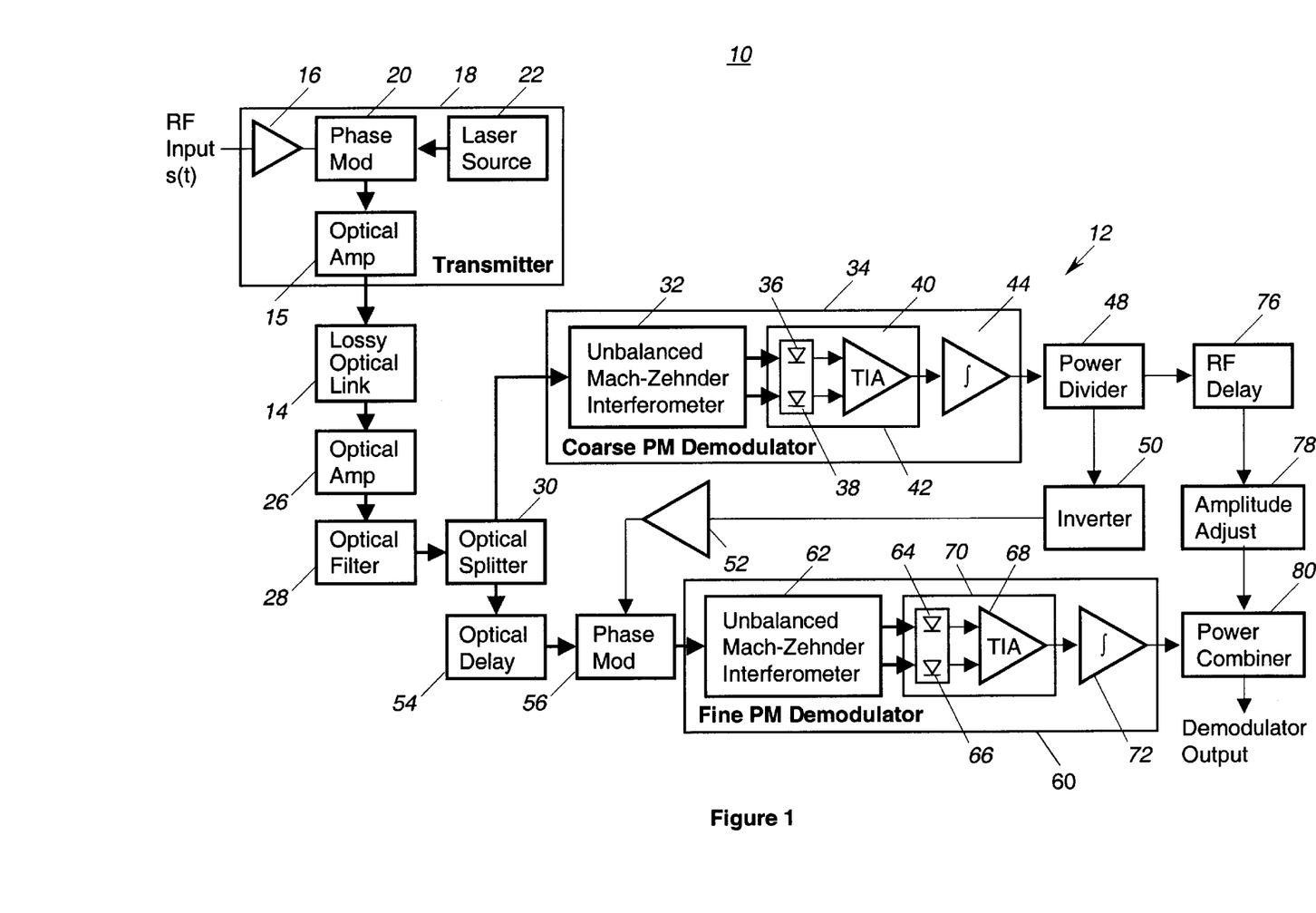
FIG. 1 is a schematic block diagram of an analog optical link communications system, including a feed-forward optical PM demodulator, according to an embodiment of the present invention.

FIG. 1 is a schematic block diagram of a communications system 10, including a feed-forward optical PM demodulation system 12, according to an embodiment of the present invention. An RF input signal s(t) to be transmitted on a lossy analog optical link 14 is applied to an RF amplifier 16 within a transmitter 18. The link 14 can be either free space or a fiber optic cable. The amplified signal is then applied to an optical phase modulator 20. Additionally, an optical carrier signal from a laser source 22 is also applied to the phase modulator 20. In one design, the RF signal s(t) generates an electric field across an optical waveguide in the modulator 20 through which the carrier signal is propagating. Changes in the electric field cause the index of refraction of the waveguide in the phase modulator 20 to change. This causes the carrier signal to speed up or slow down in association with changes in the RF signal, thus phase modulating the carrier signal. This is one example of modulation of an RF signal known in the art Other modulation schemes that provide phase modulation or frequency modulation can also be employed within the scope of the present invention. The modulated carrier signal is amplified with an optical amplifier 15 and then applied to the lossy optical link 14.

The optical carrier signal is received by an optical amplifier 26 in the receiver end of the system 10. The amplified optical signal is then bandpass filtered by an optical filter 28 that removes some of the noise generated by the optical amplifiers and the lossy optical link. The bandpass filtered PM optical signal is then applied to an optical splitter 30 within the demodulation system 12 that provides two split optical signals that are copies of the modulated optical carrier signal. The splitter 30 does not have to be a 50/50 splitter, but can be any relative power splitter suitable for a particular application, as would be understood to those skilled in the art. Additionally, an optical limiter (not shown) can be provided prior to the splitter 30 to help suppress amplitude noise from the optical amplifiers, the laser source and any time-varying link losses.

One of the signals from the splitter 30 is applied to an unbalanced optical MZI 32 within a coarse PM demodulator 34. As is known in the art, an unbalanced optical MZI separates an input optical signal into two optical paths, where the two path lengths are different so one signal is delayed relative to the other signal. The two signals are then combined in a directional coupler in the MZI 32 to produce two output signals. The MZI 32 translates frequency modulation into intensity modulation. And the two outputs are complementary of each other. In other words as the frequency of the optical carrier increases the intensity of one output goes up while the intensity of the other output goes down. The relative delay is a design parameter, but it should be set to a quadrature bias point. The MZI is quadrature biased when the relative delay is a multiple of the period of the unmodulated optical carrier offset by a quarter of its period. When the MZI is quadrature biased, the two outputs are most linear and have a common nominal intensity. The operation of an unbalanced Mach-Zehnder interferometer incorporating a directional coupler is well known to those skilled in the art.

One of the outputs from the MZI 32 is applied to a first photodetector 36 and the other output from the MZI 32 is applied to a second photodetector 38 that demodulate the optical signals to generate representative electrical signals. The two electrical signals are then applied as inputs to a differential amplifier 40. The differential amplifier 40 amplifies the difference between the two complementary RF signals, and cancels or nulls the bias as well as all common mode noise and distortion. The combination of the photodetectors 36 and 38 and the differential amplifier 40 make up a balanced photoreceiver 42. The balanced photoreceiver 42 strips away the optical carrier from the optical signal, and provides a frequency demodulated signal at the output of the differential amplifier 40. The output of the differential amplifier 40 is then applied to an RF integrator 44 to provide the PM demodulation. Using an unbalanced MZI and photoreceiver as discussed herein is a known technique for providing frequency demodulation.

The RF output from the coarse demodulator 34 is a coarse representation of the RF signal s(t), and is defined here as A[s(t)−ε(t)]. In this equation, A is the amplitude scale factor between the RF signal s(t) and the coarse demodulator output, and the error signal ε(t) represents the error in the coarse demodulator output consisting of noise and signal distortion caused by the demodulation process. The PM theoretical minimum noise is from amplified spontaneous emissions (ASE) noise from the optical amplifiers 15 and 26 beating against an unmodulated optical carrier signal (signal×ASE noise). In a properly designed link, other noise sources such as shot noise from photodetectors 36 and 38, thermal nosise from the differential amplifier 40, relative intensity noise (RIN) from the laser source 22, and ASE× ASE noise are small compared to the signal×ASE noise.

For small phase deviations, the noise generated in the coarse demodulator 34 is near the theoretical PM value. But as the phase deviations in the carrier signal approach or exceed π radians, the noise generated in the coarse demodulator 34 rises substantially above the theoretical value and the third-order distortion also becomes significant. Thus the error ε(t) in the coarse demodulator output becomes relatively large. In other words, when the phase modulator 20 modulates the carrier signal with the RF signal in such a way as to produce large phase deviations, the performance of the coarse demodulator 34 degrades. Recall that in order to provide substantially improved dynamic range and SNR performance compared to IM links, PM links must have large phase deviations. Therefore, the demodulator 34 alone cannot provide increased performance beyond the traditional IM format. Additionally, the demodulator 34 has poor linearity, similar to the known IM links that use a quadrature-bias Mach-Zehnder interferometer in the transmitter end for modulation and a photodetector in the receiver end for demodulation. Therefore, the linearity of the demodulator 34 is also not a significant improvement over the state of the art. More signal processing is thus required to provide the desired performance.

The signal from the demodulator 34 is applied to an RF power divider 48 that splits the signal into two copies of itself. One of the signals is applied to an inverter 50 that inverts the signal to be −A[s(t)−ε(t)]. This signal is applied to an RF amplifier 52 that amplifies the inverted signal back to a level near that of the RF signal at the input to the phase modulator 20 in the transmitter 18. Thus the output of the RF amplifier 52 is −[s(t)−ε(t)]. In an alternate embodiment, the power divider 48 and the inverter 50 can be combined as a single 180° hybrid that provides an inverted and a non-inverted copy of an input signal. Other components can also be used to provide a split signal and an inverted signal from the coarse demodulator 34, as would be appreciated by those skilled in the art. Additionally, the amplifier 52 can be positioned at other locations in the demodulation system 12 other than after the inverter 50, as would also be appreciated by those skilled in the art.

The other split signal from the splitter 30 is applied to an optical delay device 54 that delays the signal a period of time relative to the propagation time of the demodulator 34 and other components. The delay device 54 provides a timing alignment between the split optical signal and the signal from the amplifier 52. The delayed optical signal with phase modulation s(t) from the delay device 54 and the signal −[s(t)−ε(t)] from the amplifier 52 are aligned with each other in time. The phase modulator 56 operates in the same manner as the phase modulator 20, where the optical signal with phase modulation s(t) is modulated by the RF signal −[s(t)−ε(t)] to get an optical signal with phase modulation ε(t). In other words, the modulated carrier signal from the delay device 54 is again modulated in the phase modulator 56 by an RF signal that includes −s(t). Therefore, the signals s(t) and −s(t) cancel, leaving an optical carrier signal that is phase modulated with ε(t), i.e., the additive inverse of the noise and distortion in the signal from the demodulator 34.

The optical carrier signal from the phase modulator 56 is applied to a fine PM demodulator 60 that demodulates this signal in the same manner as the demodulator 34. Particularly, the demodulator 60 includes an unbalanced MZI 62 that generates complementary output signals that are applied to photodetectors 64 and 66 to demodulate the signal. The electrical complementary signals from the photodetectors 64 and 66 are applied to a differential amplifier 68 that generates a difference output signal that removes the bias as well as all common mode noise and distortion. The combination of the photodetectors 64 and 66 and the amplifier 68 make up a balanced photoreceiver 70. This signal is then applied to an RF integrator 72 to generate the phase demodulated RF error signal ε(t). Although the error signal ε(t) is large compared to the noise level of an ideal demodulator, it is small compared to the signal s(t) in a properly design link above threshold. Thus the phase deviations in the carrier signal at the input to the fine demodulator 60 are small, and therefore the noise generated in the fine demodulator 60 is near the theoretical PM value. The small phase deviations also allow the fine demodulator 60 to demodulate the error signal ε(t) with very little distortion.

The signal A[s(t)−ε(t)] from the power divider 48 is applied to an RF delay device 76 to align it in time with the signal from the fine demodulator 60. The signal from the RF delay device 76 is applied to an amplitude adjust device 78 to remove the scale factor A to generate the signal s(t)−ε(t). This signal is applied to a power combiner 80 along with the error signal ε(t) from the demodulator 60, that when combined provides a demodulated output of the RF signal s(t) with very little distortion and an additive noise level near the theoretical PM value. Therefore, the operation of the demodulator 12 provides a substantially clean copy of the RF input signal applied to the amplifier 16.

Figure 2:
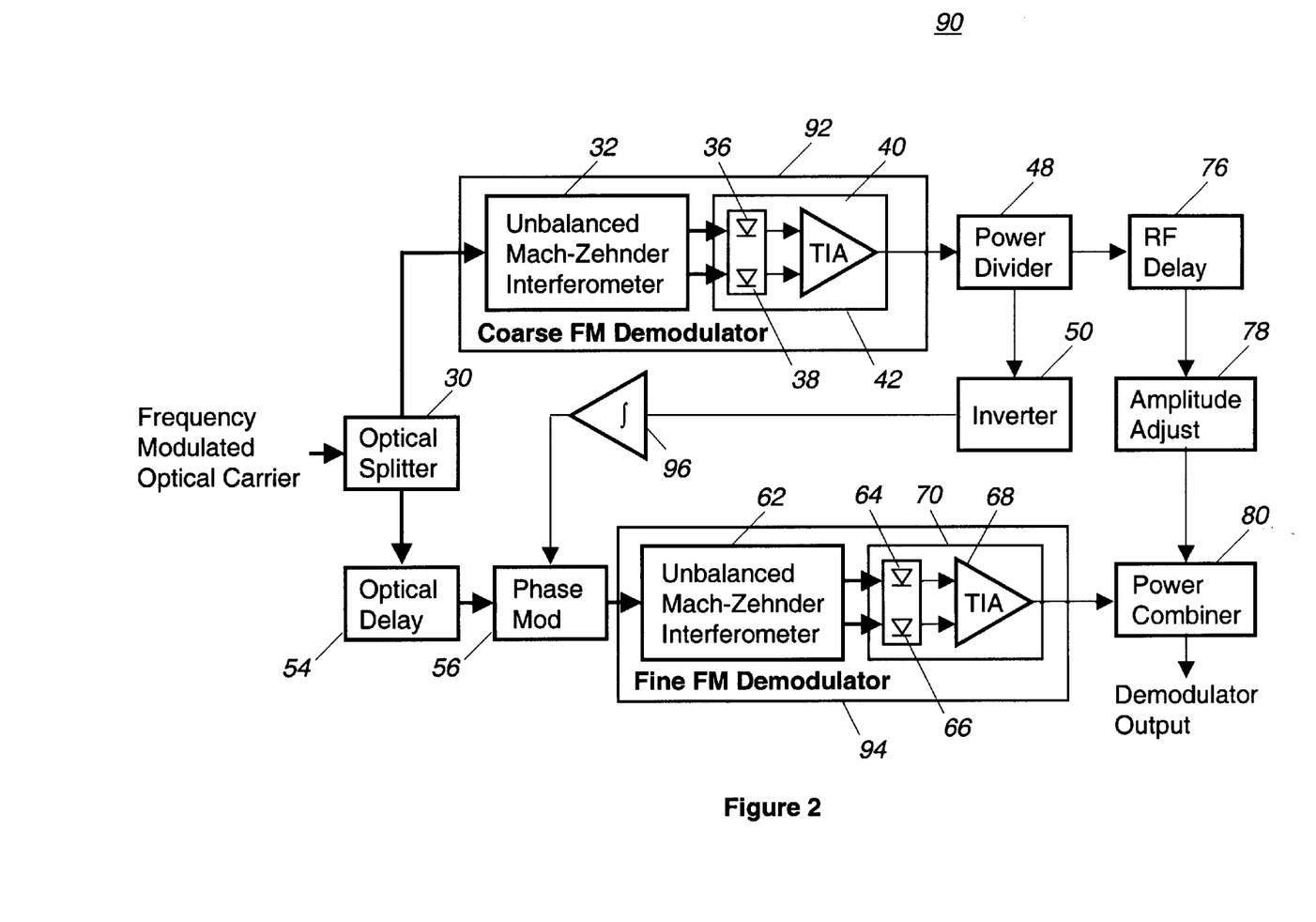
FIG. 2 is a schematic block diagram of a feed-forward optical FM demodulator, according to another embodiment of the present invention.

The same demodulation process as discussed above for the communications system 10 can be used for those systems that provide frequency modulation, as opposed to phase modulation, of the RF input signal onto the optical carrier signal. FIG. 2 is a schematic block diagram of a feed-forward optical FM demodulation system 90 depicting this variation. The transmitter portion and the optical link portion of the communications system 10 are not shown in this embodiment. The transmitter 18 would include any suitable frequency modulation device to frequency modulate the optical carrier signal from the laser source 22 with the RF input signal s(t). In one embodiment, an integrator is employed in combination with the phase modulator 20 to provide frequency modulation, as is well understood in the art.

The frequency modulated optical carrier signal is applied to the optical splitter 30 in the demodulation system 90 in the same manner as discussed above. The same reference numerals in the demodulation system 90 represent the same components as in the demodulation system 12, and operate in the same manner. In this embodiment, the coarse PM demodulator 34 is replaced with a coarse FM demodulator 92, and the fine PM demodulator 60 is replaced with a fine FM demodulator 94. The demodulators 34 and 60 become frequency demodulators by removing the RF integrators 44 and 72, as shown. Additionally, the amplifier 52 is replaced with an RF integrator 96 so that the RF signal from the inverter 50 is frequency modulated by the combination of the integrator 96 and the phase modulator 56. The resulting cancellation of the error signal is accomplished in the same manner as discussed above.

Figure 3:
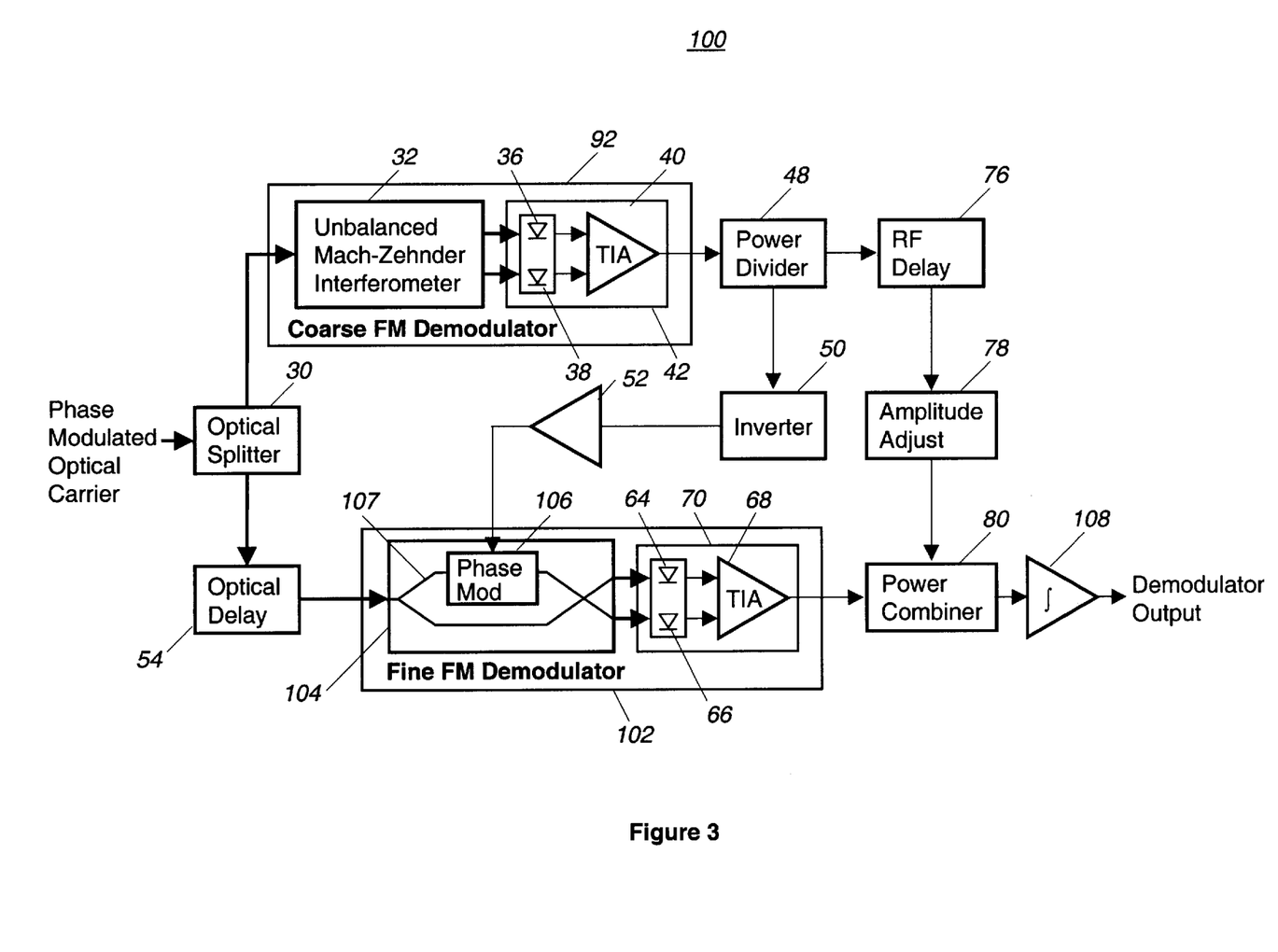
FIG. 3 is a schematic block diagram of a feed-forward optical PM demodulator, including an embedded phase modulator, according to another embodiment of the present invention.

FIG. 3 is a schematic block diagram of another feed-forward optical PM demodulation system 100 that is an alternative embodiment to the PM demodulation system 12, discussed above. The demodulation system 100 uses the coarse FM demodulator 92 and a fine FM demodulator 102 instead of the coarse and fine PM demodulators 34 and 60 because the demodulators 92 and 102 do not include the RF integrators 44 and 72 in this design. Additionally, the phase modulator 56 has been removed, and replaced with a phase modulator 106 positioned within an optical path 107 of an unbalanced MZI 104 in the fine demodulator 102. By positioning the phase modulator 106 in the MZI 104 instead of before the fine demodulator 102, the modulation on the optical carrier signal can be cancelled in the fine demodulator 102 without the need for an RF integrator 44 or 96 preceding the phase modulator 106. The modulation is not cancelled directly. Instead the MZI bias is rapidly adjusted to null the modulation in the frequency-to-intensity conversion that occurs in the directional coupler at the output of the MZI 104. This rapid bias adjustment keeps the MZI very near quadrature all the time, which allows the fine demodulator 102 to demodulate the error signal ϵ(t) with very little added noise and distortion as in the other embodiments discussed above. In this embodiment, an RF integrator 108 receives an output from the power combiner 80 to provide the phase demodulation.

Figure 4:
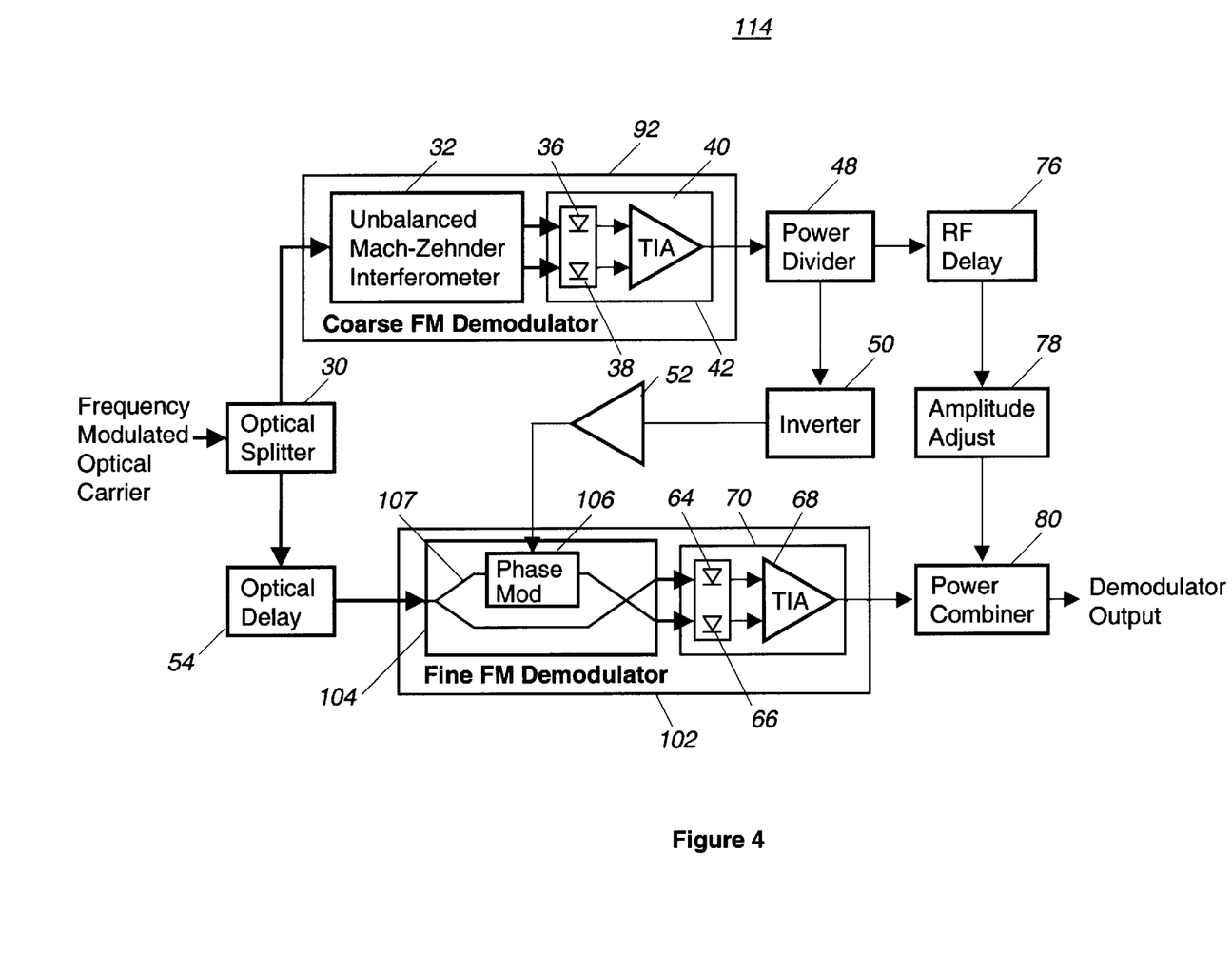
FIG. 4 is a schematic block diagram of a feed-forward optical FM demodulator, including an embedded phase modulator, according to another embodiment of the present invention.

FIG. 4 is a schematic block diagram of another feed-forward optical FM demodulator system 114 that employs the phase modulator 106 in the path 107 of the unbalanced MZI 104 in the fine FM demodulator 102. This design is for FM demodulation because the RF integrator 108 has been eliminated.

The use of unbalanced MZIs, photodetectors and differential amplifiers in the various coarse and fine demodulators discussed above is by way of a non-limiting example. Other designs, within the scope of the present invention, may include other types of demodulators that would operate substantially in the same manner as discussed herein.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. An optical demodulation system for demodulating an optical carrier signal modulated by a transmitted RF signal, said demodulation system comprising:
    an optical splitter responsive to the optical carrier signal, said splitter splitting the optical signal into a first split modulated optical signal and a second split modulated optical signal;
    a coarse optical demodulator responsive to the first split signal, said coarse demodulator demodulating the first split signal and generating a coarse RF signal, said coarse RF signal including the transmitted RF signal and the additive inverse of an error RF signal;
    a modulator responsive to the second split signal and an additive inverse of the coarse RF signal, said modulator modulating the second split signal with the inverted coarse RF signal so that the transmitted RF signals in the second split signal and the coarse RF signal cancel each other, said modulator generating a modulated error optical signal modulated with the error RF signal;
    a fine optical demodulator responsive to the error optical signal, said fine demodulator demodulating the error optical signal and generating the error RF signal; and
    a combiner responsive to the coarse RF signal from the coarse demodulator and the error RF signal from the fine demodulator, said combiner generating a demodulated RF signal.

2. The system according to claim 1 wherein the coarse and fine demodulators are frequency demodulators.

3. The system according to claim 1 wherein the coarse and fine demodulators are phase demodulators.

4. The system according to claim 1 wherein the modulator is positioned within an optical path of an interferometer within the fine demodulator.

5. The system according to claim 1 wherein the coarse and fine demodulators each include an interferometer and a photoreceiver that combine to provide the demodulation.

6. The system according to claim 1 wherein the modulator is a phase modulator.

7. The system according to claim 1 wherein the coarse demodulator includes a first Mach-Zehnder interferometer, at least one photodetector, and a first differential amplifier, said first interferometer being responsive to the first split signal and generating a first set of complementary optical signals from the first split signal, said at least one photodetector converting the first set of complementary optical signals to a first set of complementary electrical signals and said first differential amplifier converting the first set of complementary electrical signals into a coarse frequency demodulated RF signal.

8. The system according to claim 7 wherein the coarse demodulator further includes an RF integrator, said RF integrator being responsive to the coarse demodulated RF signal from the differential amplifier and generating a phase demodulated RF signal as the coarse RF signal.

9. The system according to claim 7 wherein the fine demodulator includes a second Mach-Zehnder interferometer, at least one photodetector, and a second differential amplifier, said second interferometer being responsive to the error optical signal and generating a second set of complementary optical signals from the error optical signal, said at least one photodetector converting the second set of complementary signals to a second set of complementary electrical signals and said second differential amplifier converting the second set of complementary electrical signals into a fine frequency demodulated RF signal.

10. The system according to claim 9 wherein the fine demodulator further includes an RF integrator, said integrator being responsive to the fine demodulated RF signal from the second differential amplifier and generating a phase demodulated RF signal as the error RF signal.

11. The system according to claim 1 further comprising a power divider, said power divider being responsive to the coarse RF signal and separating the coarse RF signal into a first coarse RF signal that is inverted and a second coarse RF signal that is applied to the combiner.

12. The system according to claim 1 further comprising an RF integrator, said RF integrator being responsive to the demodulated RF signal from the combiner.

13. The system according to claim 1 further comprising an RF integrator, said RF integrator being responsive to the inverted coarse RF signal and generating a coarse phase demodulated RF signal, said modulator receiving the coarse phase demodulated RF signal.

14. An optical demodulation system for demodulating an optical signal modulated by a transmitted RF signal, said demodulation system receiving the modulated optical signal at a receiver end of an analog optical link, said demodulation system comprising:

an optical splitter responsive to the optical signal, said splitter splitting the optical signal into a first split modulated optical signal and a second split modulated optical signal;

a coarse optical demodulator responsive to the first split signal, said coarse demodulator including a first Mach-Zehnder interferometer, first and second photodetectors and a first differential amplifier, said first interferometer being responsive to the first split signal and generating a first set of complementary optical signals from the first split signal, said first and second photodetectors converting the first set of complementary optical signals to a first set of complementary electrical signals, and said first differential amplifier converting the first set of complementary electrical signals into a coarse frequency demodulated RF signal, said coarse RF signal including the transmitted RF signal and the additive inverse of an error RF signal;

a phase modulator responsive to the second split signal and an additive inverse of the coarse RF signal, said phase modulator modulating the second split signal by the inverted coarse RF signal so that the transmitted RF signals in the second split signal and the coarse RF signal cancel each other, said phase modulator generating a modulated error optical signal modulated with the error RF signal;

a fine optical demodulator responsive to the error optical signal, said fine demodulator including a second Mach-Zehnder interferometer, third and fourth photodetectors and a second differential amplifier, said second interferometer being responsive to the error optical signal and generating a second set of complementary optical signals from the error optical signal, said third and fourth photodetectors converting the second set of complementary signals to a second set of complementary electrical signals, and said second differential amplifier converting the second set of complementary electrical signals into the error RF signal; and a combiner responsive to the coarse RF signal from the coarse demodulator and the error RF signal from the fine demodulator, said combiner generating the transmitted RF signal.

15. The system according to claim 14 wherein the coarse demodulator further includes a first RF integrator, said first RF integrator being responsive to the coarse frequency demodulated RF signal from the first differential amplifier and generating a coarse phase demodulated RF signal, and wherein the fine demodulator further includes a second RF integrator, said second RF integrator being responsive to the error RF signal from the second differential amplifier and generating a phase demodulated error RF signal.

16. The system according to claim 14 further comprising a power divider, said power divider being responsive to the coarse RF signal and separating the coarse RF signal into a first coarse RF signal that is inverted and a second coarse RF signal that is applied to the combiner.

17. The system according to claim 14 further comprising an RF integrator, said RF integrator being responsive to the inverted coarse RF signal and generating a coarse phase demodulated RF signal, said modulator receiving the coarse phase demodulated RF signal.

18. An optical demodulation system for demodulating an optical signal modulated by a transmitted RF signal, said demodulation system receiving the modulated optical signal at a receiver end of an optical link, said demodulation system comprising:

an optical splitter responsive to the optical signal, said splitter splitting the optical signal into a first split modulated optical signal and a second split modulated optical signal;

a coarse optical demodulator responsive to the first split signal, said coarse demodulator including a first Mach-Zehnder interferometer, first and second photodetectors and a first differential amplifier, said first interferometer being responsive to the first split signal and generating a first set of complementary optical signals from the first split signal, said first and second photodetectors converting the first set of complementary optical signals to a first set of complementary electrical signals, and said first differential amplifier converting the first set of complementary electrical signals into a coarse frequency demodulated RF signal, said coarse RF signal including the transmitted RF signal and the additive inverse of an error RF signal;

a fine optical demodulator responsive to the second split signal, said fine demodulator including a second Mach-Zehnder interferometer, third and fourth photodetectors and a second differential amplifier, said second interferometer being responsive to the second split signal and generating a second set of complementary optical signals from the second split signal, said third and fourth photodetectors converting the second set of complementary signals to a second set of complementary electrical signals, and said second differential amplifier converting the second set of complementary electrical signals into a frequency demodulated RF signal including the error RF signal;

a phase modulator positioned within an optical path of the second Mach-Zehnder interferometer, said phase modulator modulating the second split signal with the coarse RF signal so that the transmitted RF signals in the second split signal and the coarse RF signal cancel; and a combiner responsive to the coarse RF signal from the coarse demodulator and the error RF signal from the fine demodulator, said combiner generating the transmitted RF signal.

19. The system according to claim 18 further comprising an RF integrator responsive to the transmitted RF signal from the combiner, said integrator providing phase demodulation of the transmitted RF signal.

20. A method of demodulating an optical carrier signal modulated by a transmitted RF signals, said method comprising the steps of:

splitting the optical carrier signal into a first split modulated optical signal and a second split modulated optical signal;

demodulating the first split optical signal to generate a coarse RF signal that includes the transmitted RF signal and the additive inverse of an error RF signal; inverting the coarse RF signal;

modulating the second split optical signal with the additive inverse of the coarse RF signal to cancel the transmitted RF signals in the second split signal and the coarse RF signal and to generate a modulated error optical signal modulated with the error RF signal;

demodulating the error optical signal to generate the error RF signal; and combining the coarse RF signal and the error RF signal.

21. The method according to claim 20 wherein the steps of demodulating the first split signal and the error optical signal include providing frequency demodulation.

22. The method according to claim 20 wherein the steps of demodulating the first split signal and the error optical signal include providing phase demodulation.

23. The method according to claim 20 wherein the step of modulating the second split signal with the additive inverse of the coarse RF signal includes modulating within an optical path of a Mach-Zehnder interferometer.

24. The method according to claim 20 wherein the steps of demodulating include employing Mach-Zehnder interferometers, photodetectors and differential amplifiers to provide the demodulation.

* * * * *